United States Patent [19]

Todd et al.

[11] 4,159,023
[45] Jun. 26, 1979

[54] INFEED MEANS FOR AXIAL FLOW COMBINE

[75] Inventors: Robert R. Todd, Leola; Edward W. Rowland-Hill, Lancaster, both of Pa.

[73] Assignee: Sperry Rand Corporation, New Holland, Pa.

[21] Appl. No.: 821,111

[22] Filed: Aug. 2, 1977

[51] Int. Cl.[2] .............................................. A01F 12/18
[52] U.S. Cl. ............................. 130/27 T; 130/27 HA
[58] Field of Search ............ 130/27 R, 27 T, 27 HA, 130/27 JT, 27 J, 27 P; 56/14.6

[56] References Cited

U.S. PATENT DOCUMENTS

| | | | |
|---|---|---|---|
| 3,626,472 | 12/1971 | Rowland-Hill | 130/27 T |
| 3,645,270 | 2/1972 | Rowland-Hill | 130/27 T |
| 3,648,710 | 3/1972 | Rowland-Hill | 130/27 T |
| 3,664,100 | 5/1972 | Rowland-Hill | 130/27 T |
| 3,742,686 | 7/1973 | Rowland-Hill | 130/27 T |
| 3,848,609 | 11/1974 | Mortier et al. | 130/27 T |
| 3,994,303 | 11/1976 | Rowland-Hill | 130/27 T |
| 3,994,304 | 11/1976 | Todd et al. | 130/27 T |

*Primary Examiner*—Russell R. Kinsey
*Assistant Examiner*—Paul J. Hirsch
*Attorney, Agent, or Firm*—Ralph D'Alessandro; Frank A. Seemar; John B. Mitchell

[57] ABSTRACT

A crop handling unit for an axial-flow type combine harvester having an infeed region and tandem threshing and separating regions. An associated conveyor is provided for delivering crop material into the infeed region of the unit whereupon material is urged rearwardly along a generally helical path. Ultimately grain is separated from the crop material and discharged through concaves and grates in the threshing and separating regions, respectively, onto a grain pan. The infeed region is provided with improved means to spread out abnormally thick masses of material during its rearward travel.

12 Claims, 3 Drawing Figures

INFEED MEANS FOR AXIAL FLOW COMBINE

BACKGROUND OF THE INVENTION

The present invention relates to axial flow type combine harvesters and, more particularly, is directed to structure for the infeed region of a combine.

In axial flow combines one or more crop handling units each provide threshing and separating regions extending longitudinally (fore-and-aft) to the direction of travel of the combine. These units generally comprise a rotor assembly rotatably mounted in a casing having a threshing concave and a separating grate. Crop material is fed to the forward or inlet end of each unit and is then urged rearwardly within the casing to effect threshing and separation whereupon separated grain is conveyed to a holding tank and the residue, i.e., chaff, straw, etc., is discharged onto the field. In one well known commercially successful axial flow combine which has become very popular in recent years, side-by-side crop handling units are mounted to receive and handle separate portions from the same swath of crop material. Exemplary of a dual unit combine of this type is the machine shown in U.S. Pat. No. 3,742,686, issued in the name of E. W. Rowland-Hill on July 3, 1973. Other prior art combines of the axial flow type have shown only one crop handling unit for handling an entire swath. Regardless of the number of units, problems in the infeed area have been encountered during operation in particular crop conditions.

Due to the nature of the threshing function, there is a relatively small clearance between the rotor assembly and the casing, thus making it inherently difficult in axial flow combines to effectively introduce large quantities of material into the threshing region of crop handling units. To enhance feeding capacity in the past, it has been found that an auger on the forward end of the rotor assembly increases effectiveness and aggressively transfers crop material from an elevator to the inlet end of the threshing region. But in certain crop conditions, an auger type infeed mechanism tends to bunch or intermittently feed dense quantities of crop material from the crop material rearwardly into the threshing region.

Bunching of abnormally thick masses of crop material at the inlet end of the threshing region, commonly referred to as "plugging", causes uneven feeding to the threshing and separating regions which if uncorrected results in inefficient operation, overloading of the threshing mechanism and undesirable power requirements. Further, bunching may cause a thumping or intense vibration of the machine structure which is generally objectionable and could result in machine damage. In extreme cases bunching of crop material may cause jamming of the rotor and even breakdown of the machine with attendant costly repairs. Still another disadvantage is potential resulting grain crackage of some crop material which has a direct effect on the price combine operators ultimately obtain.

One prior art arrangement devised to overcome the problems mentioned above is shown in U.S. Pat. No. 3,995,645, issued in the name of E. W. Rowland-Hill on Dec. 7, 1976. In this arrangement, an axial flow type combine is provided with a concave having a relief section in the forward portion of the threshing region to accommodate abnormal masses of crop material. This configuration is designed to thin out bunched material prior to passing it rearwardly in the crop handling unit.

In summary, under certain difficult crop conditions, bunching of abnormal masses of crop material at the inlet of the threshing region of crop handling units for axial flow type combines results in uneven transport of the crop, noisy operation, high peak loads on the drive means, increased power requirements, low capacities, costly repairs, etc. These disadvantages are well known to those skilled in the art of the axial flow type harvesting machine. The main purpose of the present invention is to substantially alleviate these problems in these difficult crop conditions in a manner not heretofore known by means uniformly effective in most if not all crop conditions.

SUMMARY OF THE INVENTION

The principal object of the present invention is to provide an axial flow type combine in which the aforementioned problems have been overcome. More particularly, an object is to provide a crop handling unit for an axial flow combine in which plugging characteristics at the inlet of the threshing region of the unit are substantially reduced regardless of crop types and conditions.

In pursuance of these and other objects, the present invention contemplates new and improved structure in the infeed region of a crop handling unit for axial flow type combine harvesters. In one embodiment the unit comprises a forwardly disposed infeed region including a housing having a feed plate for initially receiving crop material and means for urging the crop material away from the plate in a substantially axial direction. A threshing region is disposed rearwardly of the infeed region and in communication therewith, which threshing region comprises a rotary assembly in operative relationship with a concave for threshing grain from said crop material. A generally cylindrical means in the infeed region provides a unique throat portion between the threshing region and the feed plate for acting in cooperation with the urging means to spread out abnormally thick masses of crop material prior to its entry into the threshing region.

The present invention also contemplates an arrangement whereby the throat portion is a relatively short cylindrical section having a substantially smooth inner surface portion and the urging means comprise auger flighting co-axially disposed within the throat portion for cooperative interaction therewith.

It thus becomes apparent that the present invention provides structure facilitating smooth flow of crop material through the threshing and separating regions resulting in a reduction of overall power requirements for the combine. Furthermore the smooth flow of crop material through the threshing and separating regions reduces the likelihood of serious plugging. This smooth flow of crop material presents a relatively thin and even mat to the threshing and separating mechanisms whereby effectiveness thereof is increased, i.e., grain loss and damage is decreased without sacrifice in power requirements.

The foregoing and other objects, features and advantages of the invention will appear more fully hereinafter from a consideration of the detailed description which follows, in conjunction with the accompanying sheets of drawings wherein one principle embodiment of the invention is illustrated by way of example. It is to be expressly understood, however, that the drawings are for illustrative purposes and are not to be construed as defining the limits of the invention.

DETAILED DESCRIPTION OF THE PREFERRED EMBODIMENT

In the following description, right hand and left hand references are determined by facing in a direction of forward travel of a combine harvester in which the crop handling unit of the present invention is embodied. Also, in the following description, it is to be understood that such terms as "forward", "rearward", "left", "right", "upwardly", etc., are words of convenience and are not to be construed as limiting terms.

Figure 1:
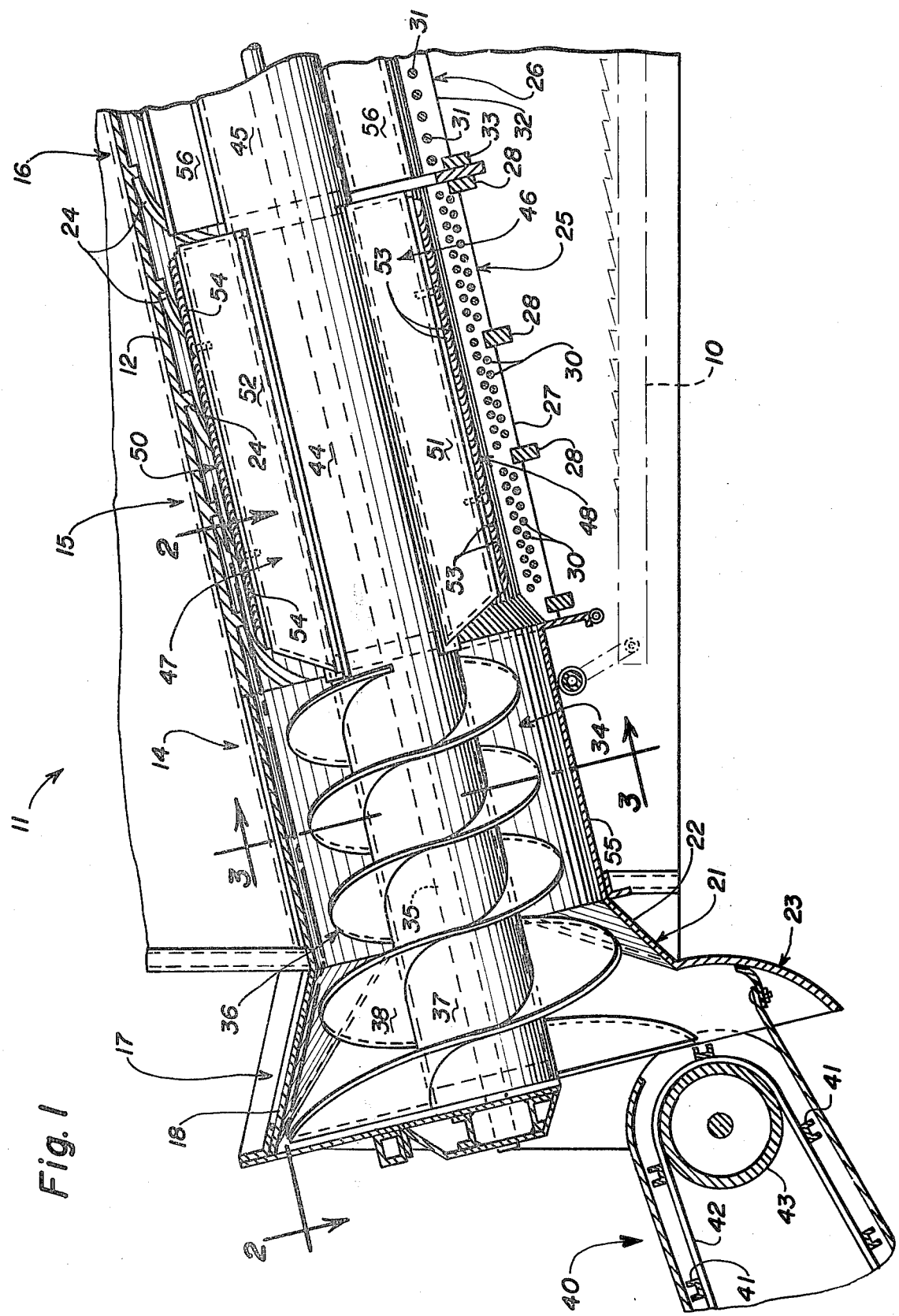
FIG. 1 is a fragmentary side elevation of a crop handling unit for an axial flow type combine harvester in which the present invention is embodied.

Referring to the drawings for a more detailed description, and particularly to FIG. 1, there is shown a fragmentary side elevation of a crop handling unit in the environs of other partly depicted elements of an axial flow type combine. The principal elements of an axial flow combine are generally known and, therefore, because the present invention is directed to an improvement to a portion of such combine, only elements related to such improvement will be described in detail. The overall construction of an axial flow combine can be readily appreciated by reference to U.S. Pat. No. 3,742,686, referred to above. For convenience, various well known combine elements will be referred to but not shown hereinafter to facilitate understanding of the environment of the present invention. It should also be pointed out that while the combine shown in U.S. Pat. No. 3,742,686 is of the self-propelled type, the improved structure incorporating the present invention may just as readily be incorporated in a pull-type machine.

Axial flow combines of the self-propelled type generally comprise a mobile frame or housing supported on front drive wheels and smaller rear steerable wheels for transport forwardly over a field having crop material which is severed by a conventional sickle bar cutter, consolidated and fed to a crop elevator which in turns conveys the crop material upwardly and rearwardly to the infeed section of one or more crop handling units whereupon threshing and separation takes place, i.e., the crop material (which may be wheat, corn, rice, soybeans, rye, grass seed, barley, oats, corn or other similar crop materials) is rubbed and beaten to loosen and separate the grain, seed, etc., from the straw, stalks, cobs or other discardable part of the crop material. While the terms grain and straw are used throughout this application for convenience, it should be understood that the terms are not intended to be limiting. The term grain as used herein thus refers to the part of the crop material that may be threshed and separated from the discardable part of the crop material which will be referred to as straw.

Straw is ultimately discharged from the rear of the separating region of crop handling units into expelling means such as a rotary beater (not shown) for discharging straw to the ground. The grain and other material which has been separated from the straw falls onto a grain pan (partly shown in phantom in FIG. 1 and designated by reference numeral 10) which in turn transfers it to means to separate clean grain from unthreshed material (known in the art as tailings). To this end it is common to provide a rotary fan to blow chaff to the rear of the machine as the grain falls through conventional sieves. The cleaned grain is then elevated into the grain tank and the tailings are delivered to the inlet end of the crop handling unit where it joins the unthreshed grain being fed into the mechanism from the crop elevator to repeat the threshing and separating cycle. Cleaned grain is finally discharged from the grain tank by an unloading system.

Figure 2:
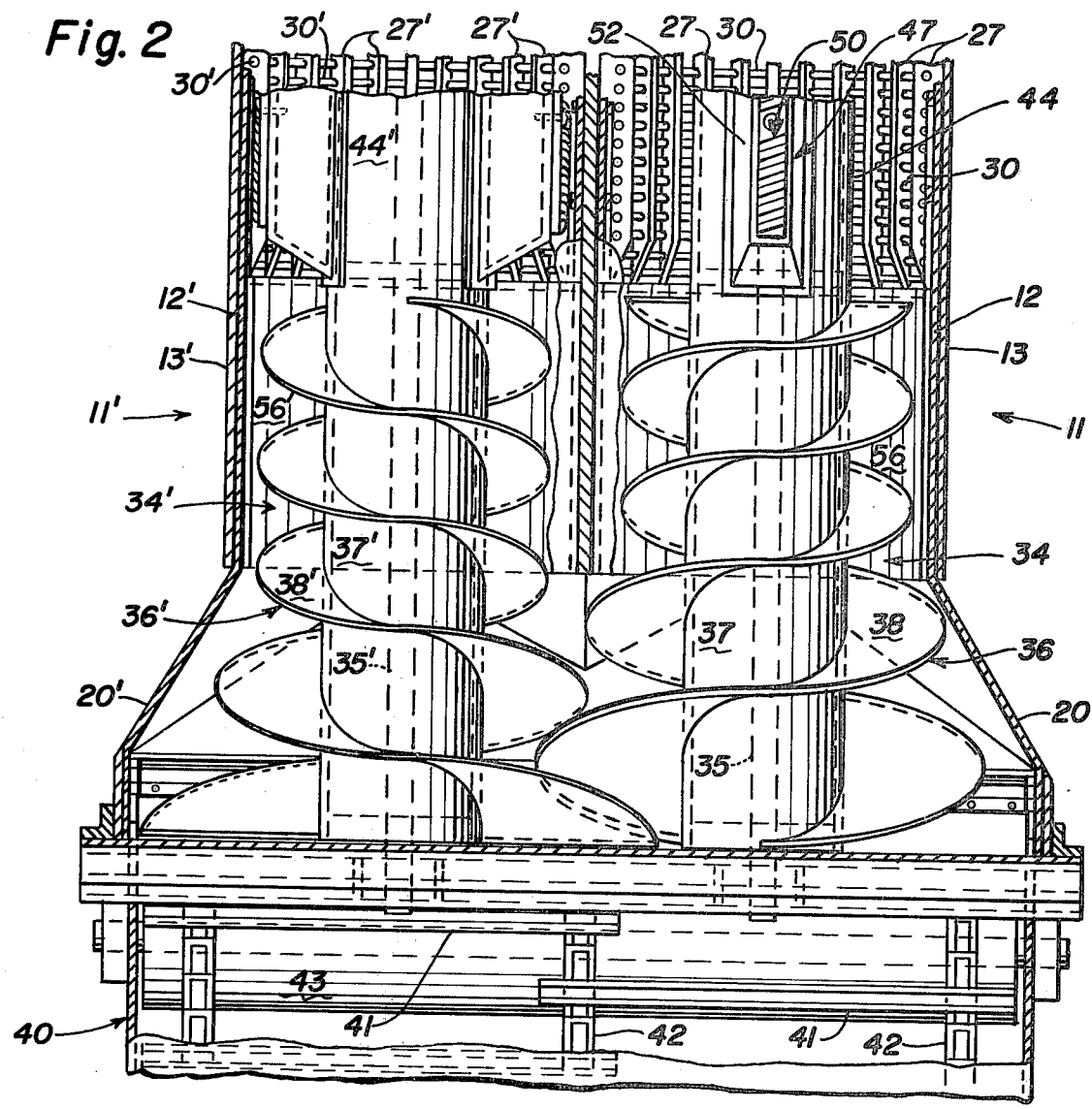
FIG. 2 is a view taken along lines 2—2 of FIG. 1.
Figure 3:
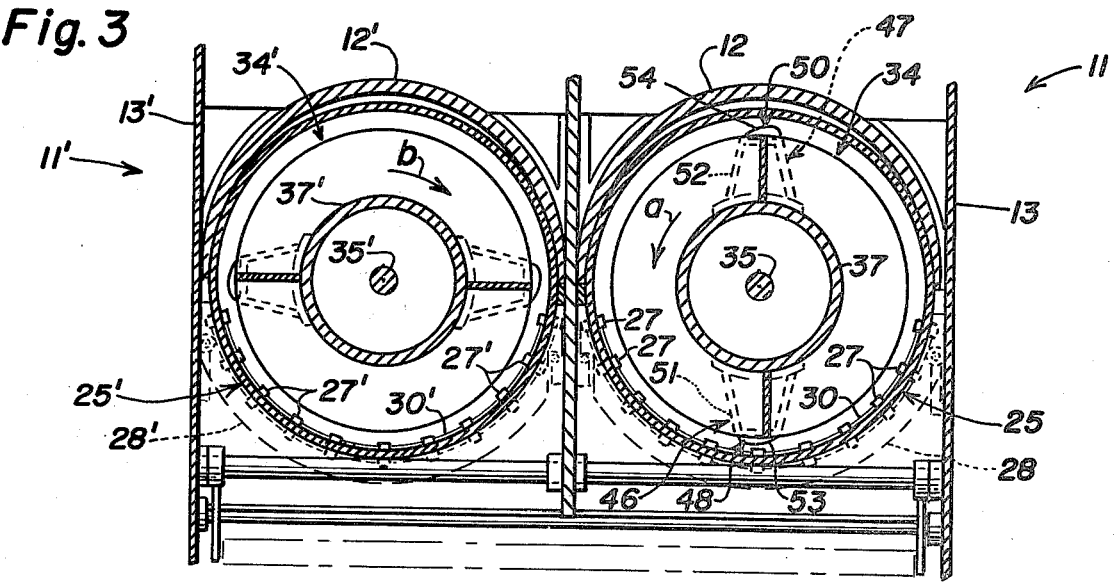
FIG. 3 is a view taken along lines 3—3 of FIG. 1.

In the preferred embodiment, the threshing and separating mechanism is embodied in two crop handling units designated by reference numerals 11 and 11' in FIGS. 2 and 3 (only the left unit 11 is shown in FIG. 1) in adjacent side-by-side relation and extending generally longitudinally of the combine. Although, the invention is described and shown in an embodiment having two crop handling units, the principles of this invention are equally applicable to all combines of the axial flow type, regardless of the number of crop handling units.

The two units 11,11' each have a casing 12,12' of a generally cylindrical configuration mounted within outer walls 13 and 13' in a side-by-side relation with parallel axes of the casings 12,12' lying in a fore-and-aft plane in an upwardly and rearwardly disposition. The casings 12,12' are open at their forward ends to receive unthreshed crop material and have rear openings for straw discharge. Because both units are substantially identical and only the left crop handling unit 11 is shown in elevation (FIG. 1), reference hereinafter for convenience will be made only to left unit 11 and where common parts are involved similar primed reference numerals will be shown in FIGS. 2 and 3 but in the description only non-primed reference numbers will be used.

Casing 12 includes an infeed section 14, a threshing section 15, and a separating section 16. An infeed housing 17, extending generally outwardly from the front edge of casings 12,12' comprises top wall portion 18, side wall portions 20,20', and bottom wall portion 21, the latter portion consisting of a transversely extending feed plate 22 and transverse arcuate element 23 continuous therewith. The top wall of casing 12 extends longitudinally from the infeed housing 17 and terminates at the rear edge of separating section 16. For the purposes of describing the present invention, it is only necessary to show the front part of separating section 16. Conveying means in the form of arcuate ribs 24 disposed at an angle to the radial plane assists in guiding crop material rearwardly along a generally helical path along casing 12 in threshing section 15 and separating section 16. The lower portion of casing 12 is provided with a threshing concave 25 and a separating grate 26. Concave 25 is formed by a plurality of longitudinally extending bars 27 secured to a series of side-by-side transverse arcuate supporting beams 28. Cylindrically curved wires 30 extend through apertures in bars 27 to form openings through which grain passes during threshing. Separator grate 26 is disposed rearwardly of concave and with the upper wall of casing 12 forms separating section 16. Separator grate 26 is similar in nature to concave 28 and comprises a plurality of wires 31 extending through apertures in bars 32 mounted on beams 33 (only one shown), but the openings between the bars and wires in the separating section are considerably larger to better suit their specific function of separating threshed grain from straw and other crop material residue.

Housed within casings 12,12' are longitudinally extending rotor assemblies 34,34' having shafts 35,35' journalled for rotation within suitable support means extending transversely to the front end of infeed housing 17 and secured to the sidewall portions 20,20' thereof. Rotor assemblies 34,34' which will be referred to in detail hereafter, are driven by appropriate drive means (not shown) coupled in the usual manner to the front ends of shafts 35,35' to rotate in opposite directions downwardly at their adjacent sides, as illustrated by the respective arrows "a" and "b" in FIG. 3. Mounted on the forward end of shaft 35 is an infeed auger 36 comprising a core 37, and flighting 38. The front portion of flighting 38 converges rearwardly and cooperates with similar flighting 38' on auger 36' in the manner described in U.S. Pat. No. 3,994,303 issued Nov. 30, 1976, in the name of E. W. Rowland-Hill.

A crop elevator 40 (FIGS. 1 and 2) attached to the combine frame forwardly of crop handling units 11,11' transfers unthreshed crop material from a header (not shown) to the inlet of infeed housings 17,17' which comprises the forwardmost portion of the infeed regions of crop handling unit 11,11'. A plurality of cross bars 41 are supported between endless chains 42 entrained around a rear drive cylinder 43 and a front supporting idler cylinder (not shown). The upper end of crop elevator 40 which is shown only fragmentarily in FIGS. 1 and 2, need not be illustrated in further details for the purposes of this invention.

Now turning to rotor assembly 34 in further detail, a rotary threshing assembly, is disposed adjacent threshing section 15 of casing 12 and a rotary separating assembly is disposed adjacent separating section 16 of the casing, both of which rotary assemblies include a main body portion with elements extending therefrom to cooperatively interact with concave 25 and grate 26, in the threshing and separating regions respectively, of crop handling unit 11. The main body portion 44 and 45 of the rotary threshing and separating assemblies are preferably of a generally cylindrical shape consistent with core 37 and each has a generally constant outside diameter throughout the length of the rotor assembly. The term "generally cylindrical" as applied to main body portions 44 and 45 is intended to cover equivalent shapes, such as but not limited to polygonal.

More specifically, the rotary threshing assembly of unit 11 comprises diametrically opposed threshing elements 46,47 mounted on the peripheral surface of main body portion 44 and extending longitudinally therealong, generally parallel to the axis of rotor assembly 34. Each threshing element 46,47 includes a rasp bar 48,50 attached to the top surface of a generally channel-shaped support member 51,52 secured by suitable means to the outer surface of the main body portion 44 of the rotor assembly such that rasp bars 48,50 are properly spaced from the periphery of rotor body portion 44. A plurality of rasps 53, 54 extend from rasp bars 48,50 respectively and are inclined or skewed with respect to the longitudinally axes of rotor assembly 34 in a manner such that they impart a rearwardly directed axial movement to the crop material during threshing operation. Each of the rasp bars 48,50 is shown to be formed from a plurality of parts, however, they could just as readily be formed as a one piece construction.

Reference is now made to FIG. 1 for a more detailed description of the cooperative relationship of the rotary separation assembly and the separating section of casing 12 comprising a generally cylindrical body including grate 26 and an arcuate top wall which in the preferred embodiment is an extension of the top wall threshing section 15. The rotary separating assembly includes two diametrically opposed fins 56 extending radially outwardly and longitudinally along main body portion 44. The fins, in alignment with threshing elements 46,47 are mounted with the outer surfaces thereof coplanar with the outer surface of a respective threshing element. As the crop material moves from the threshing region into the separating region, separating fins 56 sweep crop material in a rearward direction across separating grate 26 to separate grain entrapped in the crop material. Ribs 24 similar to those on the threshing region are disposed in the separating region to guide crop material rearwardly along its generally helical path. The straw, or discardable material, is discharged at the rear of the casing in the separating region as discussed above.

Now turning to the infeed region of crop handling unit 11, infeed section 11 of casing 12 and infeed housing 17 provide an enclosure for infeed auger 36 mounted on rotor assembly 34 coaxial with infeed section 11. The rear flights of flighting 38 extend along core 37 adjacent and in cooperative relation with an infeed throat portion 55, generally cylindrical in shape and having a smooth inner surface. Many variations of the structure of the infeed section of the infeed region are contemplated (as discussed hereinbelow) but the embodiment shown is believed to be the most desirable. At the heart of the present invention is the relationship of infeed throat 55 with the rotor assembly and its relative disposition with respect to feed plate 22 and the front inlet portion of threshing section 15. A space defined by the rotor assembly and infeed throat 55 enhances thinning of abnormal bunches or rope-like masses of crop material prior to reaching the inlet end of the threshing region. As crop material is urged along a substantially helical path by infeed auger 36 to the forward end of the threshing region whereat a close clearance exists between concave 25 and rasp bars 48,50. The material is engaged by rasp bars 48,50 in the threshing region and urged circumferentially within the casing and progressively rearwardly. Such improved interim helical movement of abnormal masses prior to threshing effectuates gradual thinning out of the material into a mat of generally uniform thickness which results in substantial and marked improvement in the operation of the combine by minimizing or eliminating thumping and reducing or eliminating damage to rasp bars 48,50 and concave 25. Further, this thinning space assures a more even and constant layer of crop material in the threshing and separating sections of casing 12, thereby resulting in less power consumption as well as less grain crackage heretofore a result of abnormally large bunches of crop material being fed directly to the relatively small space between the rotor assembly and concave.

It will be appreciated from the foregoing that the present invention provides a highly effective thinning space forward of the inlet of the threshing and separating regions whereupon abnormal masses or bunches of crop material are thinned or smoothed out during the time the direction of movement thereof is abruptly changed from generally axial to substantially circumferential. This attenuation of material just prior to its introduction to the more confined operational areas of the threshing and separating regions results in reduced power comsumption, minimal wear otherwise improved performance as discussed throughout the above description.

Although a preferred structural embodiment is descirbed in detail to illustrate the present invention, it is to be understood that the invention is not to be limited to the particular details but, that, in fact, widely different means may be employed in the practice of the broad principals of the invention. For example, it is contemplated that although throat portion 55 of casing 12 is of a cylindrical nature it could also be slightly conical without seriously affecting the overall function of this important aspect of the invention. Furthermore, ribs 14 shown in the threshing and separating regions could be extended forwardly into the infeed region to enhance the flow of material along its intended path. It is also contemplated that the broad aspects of this invention encompasses various crop urging means on the rotor assembly in the infeed region, such as paddles, fins, bars or the like.

Having thus described the invention, what is claimed is:

1. In an axial-flow, combine-harvester, crop-handling unit having
   a forwardly disposed infeed region including a housing having a feed plate for initially receiving crop material and means for urging the crop material away from the plate in a substantially axial direction, and
   a threshing region disposed rearwardly and in communication with the infeed region and comprising a rotary assembly in operative relationship with a concave for threshing grain from said crop material, the improvement comprising in combination therewith;
   generally cylindrical means providing a throat between the threshing region and said feed plate for acting in circumferential cooperation with said urging means to spread out abnormally thick masses of crop material.

2. An axial-flow, combine-harvester, crop-handling unit as set forth in claim 1, wherein said feed plate is upwardly inclined and terminates adjacent the forward edge of said cylindrical means.

3. An axial-flow, combine-harvester, crop-handling unit as set forth in claim 2, wherein said urging means comprise an auger having flighting converging rearwardly in the vicinity of said upwardly inclined feed plate.

4. An axial-flow, combine-harvester, crop-handling unit as set forth in claim 3 wherein said auger further includes flighting coaxially disposed within said generally cylindrical means.

5. An axial-flow, combine-harvester, crop-handling unit as set forth in claim 1, wherein said generally cylindrical means includes a substantially smooth inner surface portion.

6. An axial-flow, combine-harvester, crop-handling unit, as set forth in claim 5, wherein said urging means comprise an auger having flighting coaxially disposed within said generally cylindrical means.

7. An improved crop handling unit for an axial flow combine comprising:
   (A) a generally cylindrical casing assembly having
      (1) a threshing section including a concave,
      (2) a separating section including a grate rearward of said concave, and
      (3) an intermediate portion forming a throat forward of said concave,
   (B) an infeed housing including a feed plate for initially receiving crop material through an inlet opening,
   (C) a rotor assembly having a main body portion mounted coaxially with said casing and having
      (1) means for urging crop material from said feed plate rearwardly along a generally helical path, said main body portion including a core and said urging means comprising means extending from said core adjacent said intermediate portion and in circumferential cooperative relationship therewith for smoothing out abnormally thick masses of material under conditions where said rotor assembly is rotated,
      (2) threshing means extending from said main body portion for cooperative interaction with said concave in said threshing section to thresh said crop material as it travels rearwardly along its spiral path, and
      (3) crop engaging means extending from the main body portion of said rotor assembly in said separating section for engaging said crop material subsequent to its travel through said threshing section to separate threshed grain from said crop material under conditions where said crop engaging means operate in cooperative interaction with said grate in said separating section.

8. An improved crop handling unit as set forth in claim 7 wherein said feed plate is upwardly inclined and terminates adjacent the forward edge of said intermediate portion.

9. An improved crop handling unit as set forth in claim 8 wherein said urging means further comprise auger flighting converging rearwardly, which flighting is disposed in the vicinity of said upwardly inclined feed plate.

10. An improved crop handling unit as set forth in claim 9 wherein said means extending from said core comprises flighting disposed within said intermediate portion.

11. An improved crop handling unit as set forth in claim 7 wherein said intermediate portion is generally cylindrical in shape and includes a substantially smooth inner surface portion.

12. An improved crop handling unit as set forth in claim 11, wherein said urging means comprises auger flighting coaxially disposed within said generally cylindrical intermediate portion.

* * * * *